March 11, 1958     A. STEPHAN     2,826,341
FEEDING APPARATUS FOR SAUSAGE FILLING MACHINES
Filed April 17, 1956     4 Sheets—Sheet 4
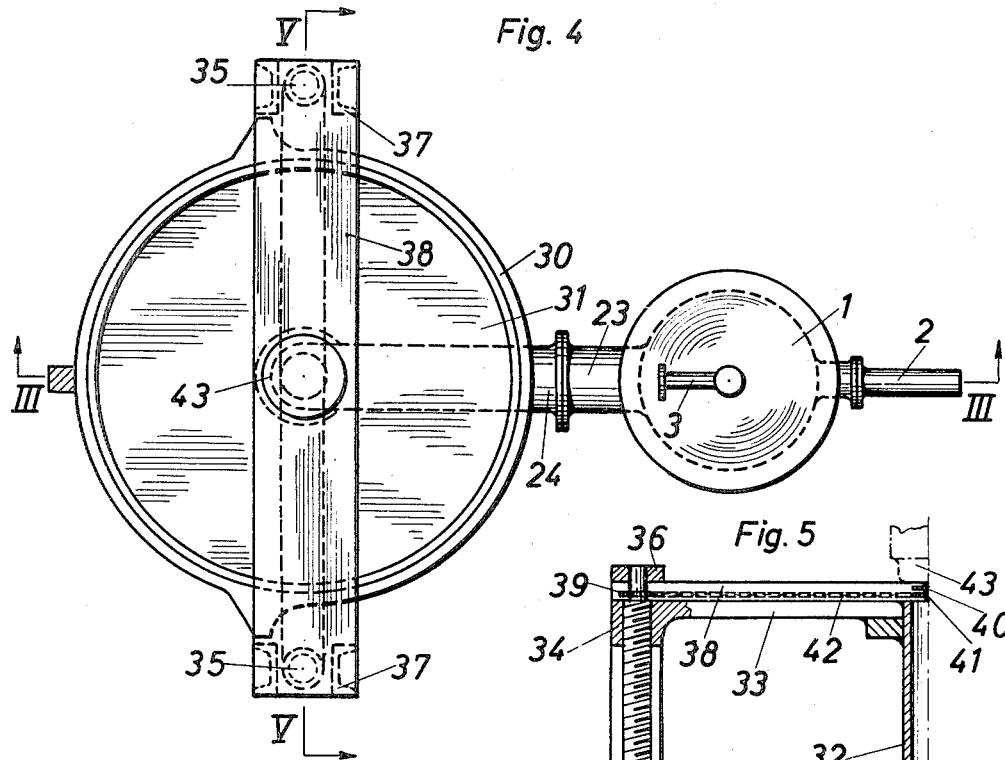
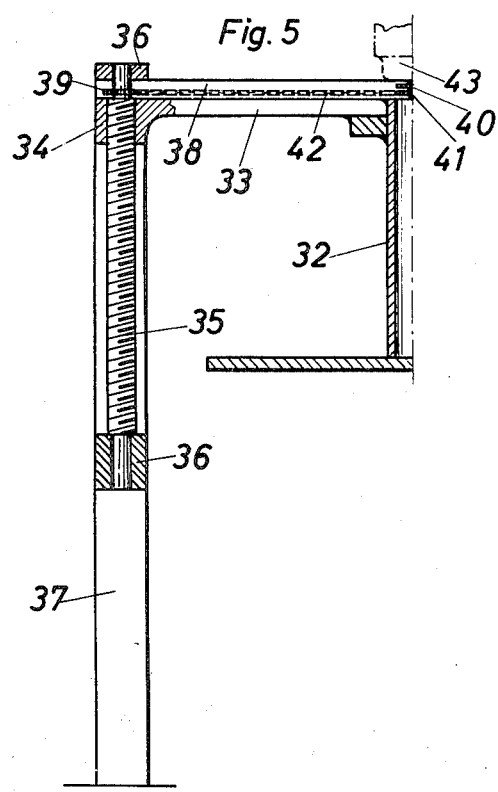

United States Patent Office 2,826,341
Patented Mar. 11, 1958

2,826,341

FEEDING APPARATUS FOR SAUSAGE FILLING MACHINES

Alfred Stephan, Hameln (Weser), Germany, assignor to A. Stephan u. Sohne, Hameln (Weser), Germany Application April 17, 1956, Serial No. 578,744

Claims priority, application Germany October 31, 1955

3 Claims. (Cl. 222—162)

This invention relates to a feeding apparatus for sausage filling machines.

It is an object of the invention to provide simple means for facilitating the production of sausage from the raw material up to the filling of the sausage mass into the gut or skin, saving labor and time and obviating the drawbacks of the previous arrangements.

In solving this problem, the difficulty must be overcome that the filling chamber of the sausage filling machine must have a relatively small diameter in order to keep a feed control within reasonable limits especially in view of the relatively high pressures required. For instance, it is not possible, owing to these difficulties, simply to provide the filling chamber of the sausage filling machine with a feeding funnel, since the quantities of sausage masses in question cannot be fed into the machine continuously and without resistance in an automatic operation.

I have found that especially the refilling of larger quantities of the disintegrated material from the cutter bowl of a large cutter into a transport vessel and the second refilling of the material into the sausage machine requires considerable forces, unnecessary manipulations and a corresponding waste of time. It is an object of the invention to facilitate these operations.

With these and further objects in view according to the present invention the collecting vessel serving for receiving the filling material to be fed into the sausage machine and preferably being constructed as a cutter bowl cooperates with means for transferring the material from the bowl into the filling chamber of the sausage filling machine.

Advantageously, the collecting vessel is provided with a plunger adapted to be relatively slid into or moved out of the collecting vessel and being fitted with separate driving means.

According to a preferred form of such an apparatus the plunger is provided with a central delivery tube or duct communicating with the filling chamber of the sausage machine.

According to another modification the bottom of the collecting vessel is formed with a discharge opening or branch for attachment of a length of tube serving as part of the feed channel to the filling chamber of the sausage machine.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a cross-sectional view of a feeding and filling apparatus with a horizontal filling chamber and with a vertically movable cutter bowl, Fig. 2 is a plan view thereof, Fig. 3 is a section on line III—III of Fig. 4, showing a filling machine with vertical filling chamber and vertically movable plunger, Fig. 4 is a plan view thereof, and Fig. 5 is a fragmentary section on line V—V of Fig. 4.

Similar reference numerals denote similar parts in the different views.

Referring now to the drawings in greater detail and first to Figs. 1 and 2, it will be seen that the horizontal filling chamber 1 of a filling machine which is normally provided with a filling branch 2 and, if desired, is fitted with a vacuum connection 3 serving for the filling operation, is mounted on a traverse 5 supported on two upright pillars 4. The filling chamber is formed integral with a vertically downwardly directed feeding channel 6 whose lower end is formed with a large flange constituting a plunger 7. Mounted in bearings 8, 9 of each of the pillars 4 is a vertical spindle 10, each being threadably engaged with a vertically movable nut member 12 or 13, respectively, provided with a nose or projection 14 in such a way that the noses of the two nut members are directed towards each other. Keyed to the upper end of each of the spindles is a chain wheel 15 or 16, respectively, each of which is connected through a chain 17 with a chain wheel 18 or 19, respectively, mounted on the driving shaft of an electromotor 20 supported on the traverse 5. A portable bowl 21 serves to receive the filling material.

The arrangement operates as follows:

At first the bowl 21 is brought near a cutting table, not shown, where it is filled with cut pieces of meat. Then it is moved into a large cutter whose cutting tools transform the material into raw sausage. The cutter bowl 21 is now moved to the sausage machine, under the plunger piston 7 thereof, by means of its rollers 44, until its flange 22 is disposed above the noses 14 of the spindle nuts 12, 13 which at this stage are in their lowest position. Then the motor 20 is switched in for rotating the spindles 10 in the device, through the chain wheels 19, 18, 15, 16 and chains 17, in such a direction that the nuts 12, 13 are moved upwards, thereby taking along the bowl 21 with the material therein, whereby the piston 7 is caused to enter into the bowl 21 and the material, if desired with the use of an evacuating device connected to the branch 3, is forced into the filling chamber 1 of the sausage machine through the hollow channel 6 connecting the piston 7 with the filling chamber 1.

When having reached their top position, the nut members 12 and 13 are returned into their bottom position as shown, by reversing the direction of rotation of the motor 20, and the empty bowl 21 is returned, for instance, to the cutter.

It will thus be understood that it is possible by means of my novel construction to avoid a repeated refilling of the material from one vessel into another vessel and the difficulties caused thereby.

In the modification shown in Figs. 3 to 5 the filling chamber 1 of a sausage machine provided with a filling branch 2 and vacuum connection 3 is vertically arranged and fitted with a connecting branch 23. Detachably connected to the branch 23 is a tubular member 24 leading to a discharge opening 28 in the bottom 29 of a portable cutter bowl 30. The discharge opening 28 is closable by a valve cone 25 through a pedal lever gear 26, 27.

A plunger piston 31 is suspended, by means of a hollow bar 32, from a traverse 33 having on each of its ends a female threaded hole 34 for cooperation with threaded spindles 35 which are rotatably secured in bearings 36 in pillars 37, 38 of a supporting frame and adapted to be rotated, through chain wheels 39 or 40, 41 and chains 42 by a motor 43 arranged on the traverse 38 of the supporting frame 37, 38.

This device is operated as follows:

A bowl 30 filled with raw material is moved underneath the plunger piston 31, by means of its wheels 44, and the length of tube 24 connected to its bottom discharge opening is connected to the branch 23 of the filling machine. Then the spindles 35 are rotated by the motor 43 through the chain wheels 40, 41 and 39 and the chains 42, whereby the piston 31 is lowered into the bowl 30. The valve 25 is now in its bottom position, so that the piston 31 is able to force the filling material into the filling chamber 1 through the length of tube 24 and the branch 23. When this operation is finished, the piston is moved out of the bowl 30 by reversing the direction of rotation of the motor and the bowl can be removed after detaching the tube 24 from the branch 23 and replaced by another one.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. For use in cooperation with a sausage machine having a filling chamber, a feeding apparatus comprising a portable cutter bowl adapted to receive the material to be filled into the sausage and means including a stationary plunger piston which is relatively slidable in the vertically movable cylindrical bowl, in an axial direction thereof, and a central delivery duct provided on the plunger piston and connected to the filling chamber, for feeding the material from the bowl into the filling chamber, through the central delivery duct.

2. For use in cooperation with a sausage machine having a filling chamber, a feeding apparatus comprising a cylindrical cutter bowl adapted to receive the material to be filled into the sausage, means for selectively closing a central discharge opening in the bottom of the cutter bowl, tube means for detachably connecting the central discharge opening of the bowl to the filling chamber, and a piston which is axially slidable in the bowl, for forcing the material from the bowl through the tube means into the filling chamber.

3. For use in cooperation with a sausage machine having a filling chamber, feeding apparatus comprising a cutter bowl having a cylindrical side wall and a bottom and, adapted to receive the material to be filled into the sausage, a plunger piston fitting said cylindrical bowl and relatively slidable in the bowl in an axial direction, a central delivery duct connecting said bowl with the filling chamber of the sausage machine and means for forcibly moving said piston relatively to said bowl in a direction toward the bottom of the bowl to force material through said duct from said bowl into said filling chamber.

References Cited in the file of this patent

UNITED STATES PATENTS

| | | |
|---|---|---|
| 1,700,405 | Guidi | Jan. 29, 1929 |
| 2,556,547 | Le Noir | June 12, 1951 |